United States Patent [19]
Almay

[11] Patent Number: 5,953,337
[45] Date of Patent: Sep. 14, 1999

[54] TRAFFIC DISTRIBUTION IN ATM NETWORK

[75] Inventor: Heikki Almay, Helsinki, Finland

[73] Assignee: Nokia Telecommunications Oy, Espoo, Finland

[21] Appl. No.: 08/702,488

[22] PCT Filed: Feb. 28, 1995

[86] PCT No.: PCT/FI95/00109

§ 371 Date: Aug. 27, 1996

§ 102(e) Date: Aug. 27, 1996

[87] PCT Pub. No.: WO95/23471

PCT Pub. Date: Aug. 31, 1995

[30] Foreign Application Priority Data

Feb. 28, 1994 [FI] Finland ..................................... 940940

[51] Int. Cl.[6] .................................................. H04L 12/56
[52] U.S. Cl. ........................................... 370/395; 370/394
[58] Field of Search .................................... 370/229, 392, 370/394, 395, 397, 473, 474, 536, 400, 230, 231, 399; 375/257, 260

[56] References Cited

U.S. PATENT DOCUMENTS

| | | | |
|---|---|---|---|
| 5,231,649 | 7/1993 | Duncanson | 370/536 |
| 5,285,441 | 2/1994 | Bansal et al. | 370/218 |
| 5,293,378 | 3/1994 | Shimizu | 370/474 |
| 5,357,508 | 10/1994 | Le Boudec et al. | 370/397 |
| 5,386,415 | 1/1995 | Ito et al. | 370/394 |
| 5,394,398 | 2/1995 | Rau | 370/394 |

OTHER PUBLICATIONS

Recommendation G.704, CCITT, "Synchronous Frame Structures Used At Primary and Secondary Hierarchical Levels", 1991.
ITU–T Recommendation I.361, "B–ISDN ATM Layer Specification", Mar. 1993.
ITU–T Recommendation I.362, "B–ISDN ATM Adaption Layer (ALL) Functional Description", Mar. 1993.
ITU–T Recommendation I.363, "B–ISDN ATM Adaption Layer (AAL) Specification ", Mar. 1993.
ITU–T Recommendation I.610, "B–ISDN Operation and Maintenance Principles and Functions", Mar. 1993.

*Primary Examiner*—Chau Nguyen
*Assistant Examiner*—Soon-Dong Hyun
*Attorney, Agent, or Firm*—Pillsbury Madison & Sutro LLP

[57] ABSTRACT

A method for traffic distribution in a network realized using ATM technology, where more than one possible route exists between two nodes for transferring data between the nodes. ATM cells belonging to a certain connection are transmitted from each node to the other, along to at least two different routes, especially in order to increase network information security.

1 Claim, 2 Drawing Sheets

TRAFFIC DISTRIBUTION IN ATM NETWORK

This application claims benefit of international application PCT/FI95/00109 filed Feb. 28, 1995.

BACKGROUND OF THE INVENTION

The invention relates to a method for traffic distribution in a network realized using the ATM technology.

ATM is a new connection-oriented packet-switched technique, where the problems of traditional packet networks have been solved by employing short, fixed-size (53-byte) packets, called cells. Each cell consists of a 48-byte payload segment and a 5-byte header. However, the ATM technology is not described here in any greater detail, as the method of the invention does not require any special applications of the ATM technology. A detailed description of the ATM technology is available e.g. in references [1] and [2] (a list of references is at the end of the specification).

In an ATM network (as in other packet networks), connections may be secured by using one or more spare routes between the nodes, in addition to the main route. Thus, when necessary (e.g. during maintenance), traffic may be transferred from one route to another.

SUMMARY OF THE INVENTION

It is an object of the present invention to improve both the quality of service offered to the subscriber and information security by utilizing these spare routes. This goal is achieved with the method of the invention.

The idea of the invention is to use, on the same connection (a connection from one subscriber to another), simultaneously at least two different routes by sending cells to different routes either according to a predetermined algorithm or in certain cases (described below) even at random. In this respect, the invention is in contradiction to the ATM specifications, which state that the cells are to follow the same route in order to maintain their relative order. (Cells relating to a particular connection form only a portion of the cells received by the node; i.e. the portion relating to the end-to-end communication between given subscribers.)

With high-speed connections, a possible change in cell order may be corrected by using an AAL protocol comprising a sequence number field for each cell. In these cases the above mentioned random transmission may be used.

The even distribution of traffic achieved by the method of the invention will facilitate dimensioning of the network and decrease delay variation. Thus subscribers may be offered qualitatively better service than before.

Even distribution of traffic will also prevent making external network analyses based on the direction of the traffic (e.g. unravelling authority relations in a military network).

Eavesdropping a virtual connection is extremely difficult in networks employing the solution of the invention, as all possible routes would need to be known.

The method of the invention has no requirements as regards the ATM network; the solution of the invention may be implemented simply as control measures on the periphery of the network.

With slow user connections, the method sets no requirements for the upper protocol layers, which may consequently be freely chosen.

BRIEF DESCRIPTION OF THE DRAWINGS

In the following, the invention and its preferred embodiments will be described in greater detail with reference to examples in accordance with the accompanying drawings, in which.

DETAILED DESCRIPTION

Figure 1:
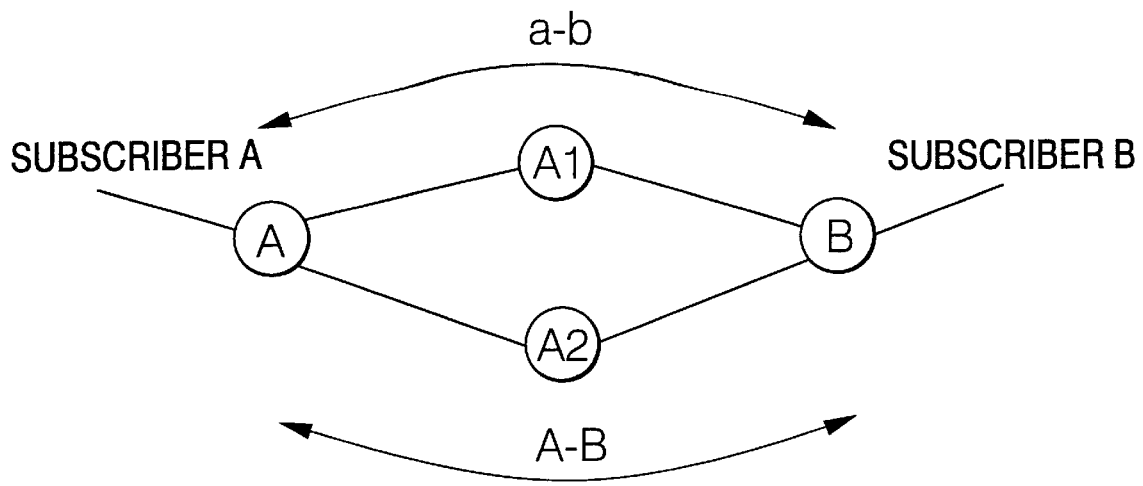
FIG. 1 shows a section of a packet-switched network where there are two possible routes between two nodes.

FIG. 1 shows a section of an ATM network where a connection between subscriber A (first party of a data link) and subscriber B (second party of a data link) has two possible routes between subscriber nodes A and B, i.e. A-B and a-b, so that A→B and a→b are one-way routes where data from subscriber A may be transmitted to subscriber B (the former route via node A2 and the latter via node A1), and B→A and b→a are one-way routes where data from subscriber B may be transmitted to subscriber A (the former route via node A2 and the latter via node A1).

In the invention, instead of using only one route at a time and keeping other routes in reserve, several, preferably all allocated, usable routes are used on the connection between the nodes. This is achieved by sending cells alternately to all routes. In the (simple) example of FIG. 1, this means the simultaneous use of routes a-b and A-B.

The method of the invention sets no requirements for the ATM Adaptation Layer, AAL, or any other protocol layers as regards connections with low peak rates (or slow constant rates), as the maximum delay variation of the network is in practice smaller than the transmission intervals of the cells. E.g., at the rate 64 kbps, filling one ATM cell will take approx. 7 ms (packing is effected by the AALL protocol described in reference [3], the protocol allowing transmission of a constant-rate bit stream in an ATM network between two AAL users). In a network with a transmission rate of 155 Mbps, a 7 ms delay variation corresponds to a buffer of more than 2,500 cells.

On the other hand, high-speed user data (which may consist of, e.g., HDLC frames originating from the local area network of the user) is converted into ATM cells using an ATM Adaptation Layer which will supply each cell with a sequence number. E.g., an AAL¾ protocol, which places the sequence number into a 4-bit SN (Sequence Number) field of an AAL¾ message format described in reference [3], may be used for this purpose. Thus, the invention utilizes the characteristics of an ATM network, known per se, for a different purpose than they are normally used. (Normally, the SN field gives numbers to protocol data units (SAR-PDU, Protocol Data Unit) of a SAR sublayer of an ATM adaptation layer which belong to the same message and which are segmented/reassembled by the SAR sublayer into/from ATM cells so that the receiver may perceive the missing protocol data units.)

In the first embodiment, successive cells are transmitted according to a predetermined algorithm, e.g. alternately, to active routes, and in high-speed connections, where the cell transmission interval as compared to the inter-route maximum delay difference is sufficiently small to risk disruption of cell order, each cell has its own sequence number, e.g. in the above mentioned SN field.

Figure 2:
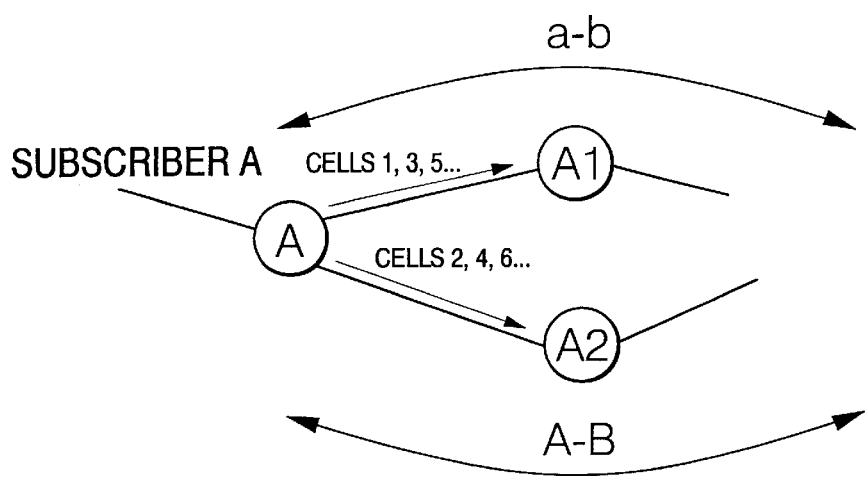
FIG. 2 illustrates distribution of traffic in the node shown in FIG. 1.

This principle of the invention is illustrated, as applies to node A, in FIG. 2, with an example where alternate cells (uneven cells) are sent to route a-b and alternate cells (even cells) to route A-B. When there are more than two alternative routes in working condition, it is naturally preferable (to maximize information security) to use all routes.

Figure 3:
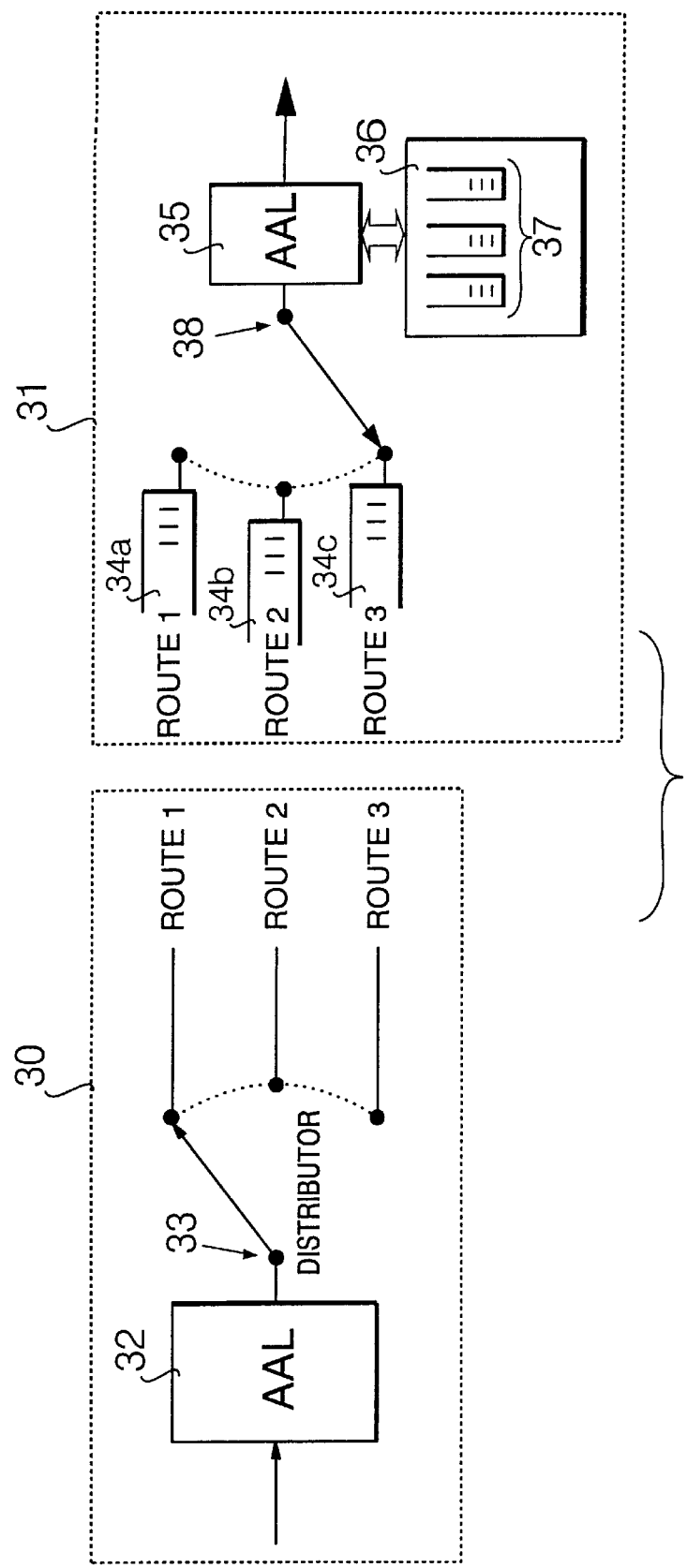
FIG. 3 shows transmission and reception in the nodes at the extreme ends of a route.

Because cells encounter delays of varying lengths on different routes, the receiving end cannot, as far as high-speed connections are concerned, be sure that cell order is intact. Hence, cell reorganization is called for at the receiving end. FIG. 3 illustrates functions in a transmitting and receiving end, 30 and 31, respectively. The ATM cell stream is created from data received from a subscriber (typically consisting of TDM or FR frames as specified in, e.g., CCITT recommendation G.704) on the periphery of the network in an ATM adaptation unit 32 of a node, which unit performs functions of an ATM Adaptation Layer AAL (and, additionally, functions of layers below the adaptation layer). Thus, in practice, the adaptation unit functions in a manner described in the recommendations I.362 (B-ISDN ATM Adaptation Layer (AAL) functional description) and I.363 (B-ISDN ATM Adaptation Layer (AAL) Specification). The choice between AAL protocols (AAL1 . . . AAL5) depends on the type and speed of the subscriber connection. The completed ATM cells are transmitted by means of a distributor 33 to different routes, of which the figure shows three. The distributor functions in one of the above described manners, i.e. by directing cells either according to a predefined algorithm or even at random to different routes. The distribution of cells to different routes may alternatively take place also at a later stage, e.g. in a switching field where the distribution takes place by means of virtual path/virtual channel (VPI/VCI) identifier pairs situated in the cell headers, the pairs being formed in the adaptation unit 32.

At the receiving end 31 (e.g. the node B), cells are read from reception buffers 34a. . . 34b by means of a selector 36 by using an algorithm corresponding to the one used at the transmitting end. The reading may also take place in some other order if the cells have sequence numbers. In the latter case the receiving end does not necessarily have to know in which order the cells were transmitted. From the selector the cells are input into an identifier unit 35, which, in performing functions of the ATM adaptation layer, AAL, (and, additionally, the ATM and physical layers below the adaptation layer), will reassemble the user data in a manner known per se.

In case the cells have sequence numbers, the receiving end needs a separate arranger unit 36, which will arrange the cells, on the basis of their sequence number, into the right order by using buffers 37 (one buffer per route).

To summarize, the following may be presented regarding the transmitting and receiving ends, respectively.

1. At a transmitting end:
   functions of an ATM adaptation layer (AAL) are performed,
   if cells are transmitted at intervals that are longer than the variation of the transfer delays of different routes, maintaining cell order requires no specific measures,
   cells are routed to different routes according to a predefined algorithm, and, additionally, in high-speed connections routing may be effected at random, as each cell will have a sequence number.

2. At a receiving end:
   functions of an ATM adaptation layer (AAL) are also performed,
   if cells are transmitted at intervals that are longer than the variation of the transfer delays of different routes, data may be reassembled from different routes as if it came along one single route.

In the above examples, the routes between subscriber nodes consisted of two mutually completely unconnected physical transmission paths. However, it must be understood that the same physical line or another like transfer medium may form a section of two or more routes leading from one subscriber node to another. In other words, packets of the same connection directed to different routes may travel part of the way via the same physical line (or like transfer medium). This means that ATM cells belonging to a certain connection are sent from a node (A or B) to at least two different virtual connections which are at least partly transmitted via different lines (or like transfer media) (but which nonetheless concern the same subscribers). (A virtual connection is an actual packet-switched end-to-end connection.)

Even though the invention has been explained in the above with reference to examples in accordance with the accompanying drawings, it is obvious that the invention is not restricted to them but can be modified within the scope of the inventive idea disclosed in the above and recited in the attached claims. E.g., the more exact structure of the subscriber nodes on the periphery of the ATM network (at the ends of a connection) may vary in a manner known per se, as the solution of the invention requires no special solutions in subscriber nodes.

A list of references:

[1]. Recommendation I.610: B-ISDN operation and maintenance principles and functions, CCITT Study Group XVIII Geneva, Jun. 9–19, 1992.

[2]. Recommendation I.361: B-ISDN ATM Layer Specification, CCITT; ANSI T1.617 Annex D.

[3]. Recommendation I.363: B-ISDN ATM Adaptation Layer (AAL) Specification.

I claim:

1. A method for ATM cell traffic distribution in an ATM-telecommunications network which includes a transmitting node connected to a first subscriber, and performing functions of an ATM adaptation layer, a receiving node connected to a second subscriber, and performing functions of an ATM adaptation layer, a first node forming part of a first transmission route between said transmitting node and said receiving node, at least one second node each forming a respective alternative transmission route between said transmitting node and said receiving node, said method comprising the steps of:

said first subscriber transmitting to said transmitting node, in a correct cell order, sequential cells belonging to a connection between said first subscriber and said second subscriber;

furnishing respective ones of said sequential cells with a sequence number field containing a respective sequence number according to an ATM Adaptation Layer Protocol, as sequential ATM cells belonging to the connection;

said transmitting node distributing between said first transmission route and said at least one second, alternative, transmission route said sequential ATM cells belonging to the connection;

transmitting to the receiving node some of said sequential ATM cells on said first transmission route and others of said sequential ATM cells on said at least one alternative transmission route according to said distributing;

said receiving node assembling into an assembled sequential ATM cell stream those of said sequential ATM cells which were transmitted thereto on said first transmission route and those of said sequential ATM cells which were transmitted thereto on said at least one alternative transmission route, according to said furnished sequence number fields in said sequential ATM cells; and transmitting said assembled sequential ATM cell stream to said second subscriber from said receiving node in an order corresponding to said correct cell order, wherein said distributing converts user data into ATM cells by using an AAL protocol that supplies each ATM cell to be transmitted with said respective sequence number, which is used at the receiving node in said assembling step to arrange the ATM cells received via different ones of said transmission routes into said correct cell order, and wherein said distributing is effected by randomly distributing successive cells for transmission to said receiving node along said different transmission routes.

\* \* \* \* \*